(12) United States Patent
Wada et al.

(10) Patent No.: US 9,146,357 B2
(45) Date of Patent: Sep. 29, 2015

(54) OPTICAL FIBER-BASED OPTICAL FUNCTIONAL DEVICE CARTRIDGE MODULE

(75) Inventors: Naoya Wada, Tokyo (JP); Tetsuya Kobayashi, Ageo (JP); Yusaku Tottori, Ageo (JP)

(73) Assignees: NATIONAL INSTITUTE OF INFORMATION AND COMMUNICATIONS TECHNOLOGY, Tokyo (JP); OPTOQUEST CO., LTD., Saitama (JP)

( * ) Notice: Subject to any disclaimer, the term of this patent is extended or adjusted under 35 U.S.C. 154(b) by 0 days.

(21) Appl. No.: 14/343,176

(22) PCT Filed: Jul. 19, 2012

(86) PCT No.: PCT/JP2012/068299
§ 371 (c)(1),
(2), (4) Date: Mar. 6, 2014

(87) PCT Pub. No.: WO2013/035441
PCT Pub. Date: Mar. 14, 2013

(65) Prior Publication Data
US 2014/0212094 A1  Jul. 31, 2014

(30) Foreign Application Priority Data

Sep. 9, 2011 (JP) ................................ 2011-197263

(51) Int. Cl.
*G02B 6/26* (2006.01)
*G02B 6/42* (2006.01)
*G02B 6/32* (2006.01)
*G02B 6/36* (2006.01)

(52) U.S. Cl.
CPC *G02B 6/26* (2013.01); *G02B 6/264* (2013.01); *G02B 6/32* (2013.01); *G02B 6/3616* (2013.01)

(58) Field of Classification Search
CPC ......... G02B 6/264; G02B 6/32; G02B 6/4453
USPC .......................................................... 385/52
See application file for complete search history.

(56) References Cited

U.S. PATENT DOCUMENTS 5,778,132 A    7/1998  Csipkes et al.
7,164,817 B2 * 1/2007  Kagami et al. .................. 385/20
(Continued)

FOREIGN PATENT DOCUMENTS

JP    57-135534    8/1982
JP    07-77640     3/1995
(Continued)

OTHER PUBLICATIONS

International Search Report, mailed Oct. 16, 2012, for corresponding International Application No. PCT/JP2012/068299.
(Continued)

*Primary Examiner* — Ryan Lepisto
(74) *Attorney, Agent, or Firm* — Greenblum & Bernstein, P.L.C.

(57) ABSTRACT

A cartridge-type optical functional module achieves excellent optical coupling and may include an optical fiber-type module and/or a waveguide-type module. A cartridge-type optical functional module is provided that includes first and second optical fiber collimators, an optical functional object that has an optical fiber-type module or a waveguide-type module, and a base section. The optical functional object also includes a third collimator, and a first alignment mechanism for aligning the position of the third collimator in the optical functional object.

4 Claims, 2 Drawing Sheets

(56) References Cited

U.S. PATENT DOCUMENTS

| | | |
|---|---|---|
| 2002/0146227 A1 | 10/2002 | Suzuki et al. |
| 2003/0007773 A1 | 1/2003 | Kondo et al. |
| 2003/0152326 A1 | 8/2003 | Morimoto et al. |
| 2003/0223683 A1 | 12/2003 | Bennett et al. |
| 2004/0120682 A1* | 6/2004 | Bhagavatula et al. ........ 385/137 |
| 2005/0025931 A1 | 2/2005 | Kondo et al. |
| 2005/0088651 A1 | 4/2005 | Yuan |
| 2006/0197943 A1* | 9/2006 | Kewitsch .................... 356/73.1 |
| 2008/0063344 A1 | 3/2008 | Suzuki et al. |
| 2010/0170076 A1 | 7/2010 | Suzuki et al. |

FOREIGN PATENT DOCUMENTS

| | | |
|---|---|---|
| JP | 10-142427 | 5/1998 |
| JP | 10-206686 | 8/1998 |
| JP | 2000-231034 | 8/2000 |
| JP | 2002-286969 | 10/2002 |
| JP | 2003-14937 | 1/2003 |
| JP | 2003-14945 | 1/2003 |
| JP | 2003-107276 | 4/2003 |
| JP | 2003-270484 | 9/2003 |
| JP | 2005-128532 | 5/2005 |
| JP | 2006-78773 | 3/2006 |
| JP | 3933967 | 6/2007 |
| JP | 2008-83696 | 4/2008 |
| JP | 2008-109598 | 5/2008 |

OTHER PUBLICATIONS

Extended European Search Report, mailed Mar. 18, 2015, from the European Patent Office (EPO), in the corresponding European Patent Application No. 12830065.4.

* cited by examiner

OPTICAL FIBER-BASED OPTICAL FUNCTIONAL DEVICE CARTRIDGE MODULE

TECHNICAL FIELD

The present invention relates to an optical fiber-based optical functional device cartridge module.

BACKGROUND ART

JP 3933967 B1 (Patent Literature 1) discloses an optical functional device cartridge module. A cartridge type optical functional module disclosed in this document is to be used for bulk optical functional devices.

CITATION LIST

Patent Literature

Patent Literature 1: JP 3933967 B1

SUMMARY OF INVENTION

Technical Problem

In the meantime, there have been needs for modules using optical devices other than bulk optical devices. If an optical fiber-based module or a waveguide-based module are attempted to be mounted in a cartridge of the module disclosed in JP 3933967 B1 (Patent Literature 1), there has been a problem that good optical coupling cannot be achieved between the optical fiber collimators at both ends of the module.

Furthermore, with the conventional optical functional device cartridge module, there has been a problem that optical amplification cannot be performed.

Solution to Problem

The present invention is basically based on a finding that good optical coupling between optical fiber collimators at both ends of a module can be achieved by mounting collimators and providing an alignment mechanism for the collimator in a cartridge.

Furthermore, the present invention is based on a finding that an optical fiber-based module including an EDFA or a waveguide-based module can be mounted in a cartridge since good optical coupling between optical fiber collimators at both ends of a module can be achieved.

A cartridge type optical functional module 10 according to the present invention includes: first and second optical fiber collimators 2 and 3 opposed to each other; an optical functional object 5, and a base part 7 in which the optical functional object 5 is detachably placed. The first and second optical fiber collimators 2 and 3 are fixed to the base part 7. In addition, the optical functional object 5 includes at least one optical device 4 having an optical function placed therein and positioned to be able to couple between the first and second optical fiber collimators 2 and 3.

In this module, the optical device 4 is an optical fiber-based module or a waveguide-based module. In addition, the optical functional object 5 includes a third collimator 13, and a first alignment mechanism 17 to align the position of the third collimator 13 in the optical functional object 5.

In this module, the first alignment mechanism 17 is preferably a mechanism to align vertical and horizontal positions of the third collimator 13.

In this module, the optical device 4 is preferably an optical fiber amplifier.

In this module, the optical device 4 is preferably an optical delay circuit.

Advantageous Effects of Invention

According to the present invention, good optical coupling between optical fiber collimators at both ends of a module can be achieved by mounting an optical fiber collimator also in each cartridge and also providing an alignment mechanism for the optical fiber collimator in each cartridge. As a result, according to the present invention, an optical fiber-based module or a waveguide-based module can be mounted in a cartridge.

Furthermore, the present invention provides an optical fiber-based optical functional device cartridge module capable of optical amplification by using an EDFA module as the optical fiber-based module.

DESCRIPTION OF EMBODIMENTS

According to the present invention, at least cartridges positioned at both ends include collimators. Furthermore, according to the present invention, the shape of cartridges is devised so as to allow fine alignment of the positions of the collimators, for example. A collimator insertion portion is provided at the center of a cartridge, and an alignment mechanism is provided in an upper hole and a hole in the lateral direction of the collimator insertion portion. As a result, in actual setup of the module, the positions of the collimators can be aligned after multiple cartridges are mounted on the base so as to optimize optical coupling of the cartridges and optical coupling with optical fiber collimators. Examples of the alignment mechanism include a screw that can be manually moved and an actuator that can move the positions according to an electric instruction. The alignment mechanism can optimize the positions of the collimators, which allows optimum optical coupling when an optical fiber-based or waveguide-based optical device is used.

Figure 1:
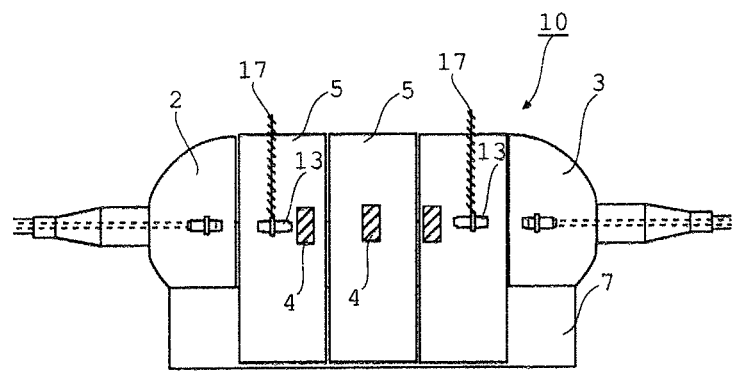
FIG. 1 is a conceptual diagram for explaining a configuration of a cartridge type optical functional module according to the present invention.

A module according to the present invention will be described below with reference to the drawings. FIG. 1 is a conceptual diagram for explaining a configuration of a cartridge type optical functional module according to the present invention. As illustrated in FIG. 1, a cartridge type optical functional module 10 according to the present invention includes first and second optical fiber collimators 2 and 3 that are opposed to each other, an optical functional object 5, and a base part 7 that connects the first and second optical fiber collimators 2 and 3 and in which the optical functional object 5 is detachably placed. The optical functional object 5 is a cartridge in which at least one optical device 4 having an optical function is placed in a manner allowing optical coupling between the first and second optical fiber collimators 2 and 3. In the example illustrated in FIG. 1, three optical functional objects 5 that are cartridges are included.

The cartridge type optical functional module basically has the same functions as the cartridge type optical functional module disclosed in Patent Literature 1. Specifically, the first and second optical fiber collimators 2 and 3 are provided with a predetermined space at both ends of the base part 7. In addition, a predetermined number of optical functional objects 5 can be installed in the form of cartridges between the first and second optical fiber collimators 2 and 3 and fixed to the base part 7. The optical devices in the respective cartridges and the first and second optical fiber collimators 2 and 3 are optically coupled. The cartridge type optical functional module 10 can thus be used as a module having various optical functions by replacing the cartridges.

The first and second optical fiber collimators 2 and 3 each have an optical fiber part and a collimator part. The collimator part and the optical fiber part are connected in a manner that light can be transmitted therebetween. The collimator part of the first optical fiber collimator 2 and the collimator part of the second optical fiber collimator 3 are opposed with a space above the base part 7 therebetween. Within this space, a predetermined number of cartridges can be inserted.

The first and second optical fiber collimators 2 and 3 each preferably have a second alignment mechanism for alignment the position of the collimator part. An example of such as alignment mechanism is a mechanism that can move the collimator part vertically or horizontally. Another example of the alignment mechanism is a mechanism that can align the vertical position of the collimator by pushing the collimator from above or underneath with a screw or an actuator like a collimator alignment mechanism to be described later. Still another example of the position alignment mechanism is a mechanism that can align the lateral position of the collimator by pushing the collimator from the right or the left with a screw or an actuator like a collimator alignment mechanism to be described later.

Figure 2:
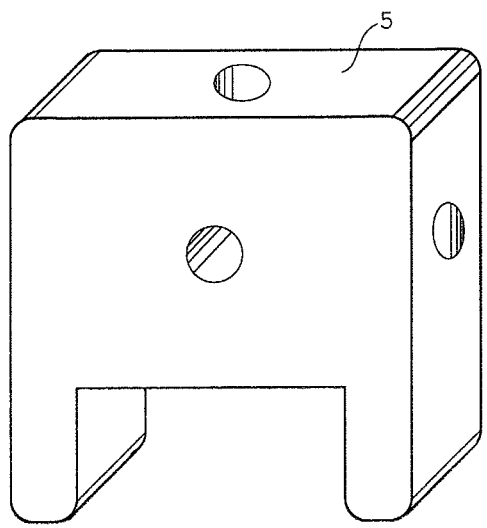
FIG. 2 is a diagram for explaining an example of external appearance of an optical functional object according to the present invention.

FIG. 2 is a diagram for explaining an example external appearance of an optical functional object according to the present invention. The optical functional object 5 is of a cartridge type object in which an optical device 4 is placed. The optical device 4 is positioned so as to allow optical coupling between the first and second optical fiber collimators 2 and 3 with a third collimator 13 to be described later. The number of optical functional objects 5 may be one or may be two or more. When the number of optical functional objects 5 is one, two collimators and an optical device may be provided. The two collimators are optically connected to the optical device and each can be optically coupled between the first and second optical fiber collimators 2 and 3. When the module 10 according to the present invention can have multiple optical functional objects 5 mounted thereon, the optical functional objects 5 may have the same function or may have different functions. When the module 10 according to the present invention can have multiple optical functional objects 5 mounted thereon, all the optical functional objects need not have optical fiber-based modules or waveguide-based modules. For example, when one or more optical functional objects are optical fiber-based modules or waveguide-based modules, the other optical functional objects may be dummies or may have bulk optical devices. In this case, a cartridge may be divided into multiple cartridges, the third collimator 13 may be mounted in a cartridge at the end and the optical device 4 may be mounted in a cartridge adjacent thereto. One cartridge may have the third collimator 13 and the optical device 4 mounted therein.

When one cartridge has two third collimators 13, the third collimators 13 are provided at a light inlet and a light outlet of the optical functional object 5. Thus, the two third collimators 13 are typically provided on a front face and a rear face of the cartridge. In addition, the two third collimators 13 are optically connected with the optical device. The third collimators 13 are preferably provided at positions corresponding to those of the collimator parts of the first and second optical fiber collimators when the cartridge is attached to the base part 7. The third collimators 13 may be optical fiber collimators each having an optical fiber part and a collimator part.

The optical device 4 is configured to allow light transmission to/from the third collimator 13 or an optical device in an adjacent cartridge. In the present invention, the optical device 4 is an optical fiber-based module or a waveguide-based module. An example of the optical fiber-based module is an optical fiber amplifier (such as an EDFA module). The EDFA (erbium doped fiber amplifier) module is a module including an EDFA fiber and having a light amplifying function. Another example of the optical fiber-based module is an optical delay circuit including an optical fiber. The optical delay circuit is provided with a circuit using the optical fiber in a cartridge. The optical delay circuit causes an optical delay corresponding to the time taken for light to propagate through the optical fiber. An example of the waveguide-based module is an SOA (semiconductor optical amplifier).

The third collimators 13 may be provided at parts adjacent to the first and second optical fiber collimators 2 and 3 or may be provided in respective cartridges.

As illustrated in FIG. 2, the optical functional object 5 preferably has a hole forming a light path at the upper center thereof and holes in the upper face and side faces toward the light path. The optical functional object 5 contains either or both of the collimator and the optical device. Furthermore, an alignment mechanism 17 is provided in the holes in the upper face and side faces toward the light path.

Figure 3:
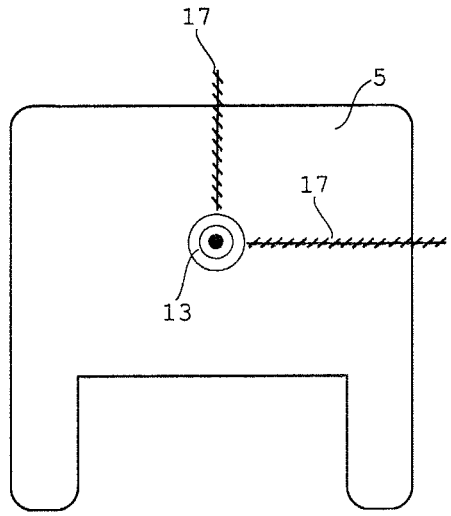
FIG. 3 is a diagram for explaining an alignment mechanism according to the present invention.

FIG. 3 is a diagram for explaining an alignment mechanism according to the present invention. In the example illustrated in FIG. 13, the alignment mechanism 17 is a screw, The vertical position of the third collimator 13 can be aligned by using an upper screw 17. In addition, the horizontal position of the third collimator 13 can be aligned by using a side screw 17.

Figure 4:
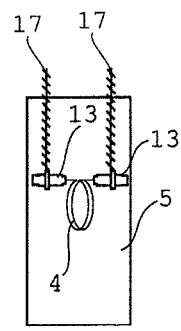
FIG. 4 is a diagram for explaining an example of the optical functional object according to the present invention.

The base part 7 is a base for fixing the first and second optical fiber collimators 2 and 3 and in which the optical functional object 5 is detachably placed. Typically, the first and second optical fiber collimators 2 and 3 are provided at respective ends of the base part 7 to fix the first and second optical fiber collimators 2 and 3 to the base part 7, As illustrated in FIG. 1, the optical functional object 5 may include the third collimator and one optical device. Alternatively, there may be an optical functional object 5 that includes the third collimator and an optical functional object 5 that includes an optical device. FIG. 4 is a diagram for explaining an example of the optical functional object according to the present invention. As illustrated in FIG. 4, the optical functional object 5 according to the present invention may include two collimators 13 and the alignment mechanisms 17 for the respective collimators in one cartridge. In the example of FIG. 4, the optical device is of an optical fiber-based (such as an EDFA fiber or a delay circuit).

Figure 5:
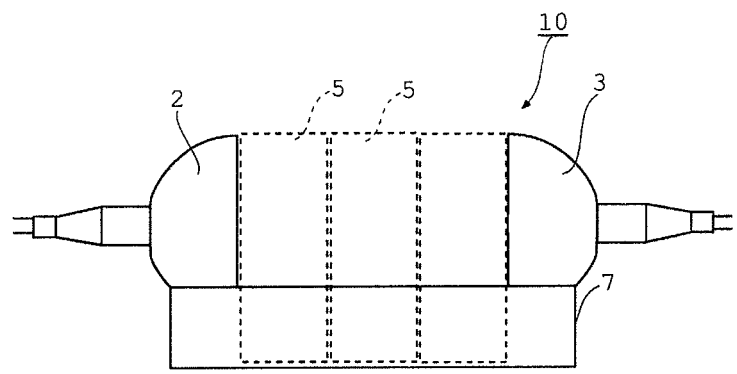
FIG. 5 is a diagram for explaining a base part according to the present invention.

For the base part 7, a base part disclosed in FIGS. 8 and 9 of Patent Literature 1, for example, can be used where appropriate. FIG. 5 is a diagram for explaining the base part according to the present invention. As illustrated in FIG. 5, a predetermined number of cartridges 5 can be installed within the space of the base part 7 between the first and second optical fiber collimators 2 and 3. Then, the positions of the collimators in the cartridges can be aligned so that good optical coupling between the optical devices contained in the cartridges 5 and the first and second optical fiber collimators 2 and 3 can be achieved.

For example, the optical functional object 5 may be provided with an attachment portion for fixing the optical functional object 5 to the base part 7. In addition, the base part 7 may be provided with an engagement portion to engage with the attachment portion to fix the optical functional object 5 to the base part 7.

Next, an example of use of the cartridge type optical functional module 10 according to the present invention will be described. The first and second optical fiber collimators 2 and 3 are provided at both ends of the base part 7. Then, the types of cartridges to be inserted into the base part 7 are determined according to the functions necessary for the module. If the number of the space where cartridges are installed is larger than the necessary number, a dummy cartridge may be inserted. The dummy cartridge is a cartridge allowing optical coupling with adjacent cartridges but particularly having no optical functions. An example of the dummy cartridge is a cartridge having a fiber or an optical crystal as the optical device. After determining the types of cartridges to be inserted, the cartridges are inserted and installed in the base part 7. For the installation, lower recesses (recessed portions) of the cartridges may engage with projections (projecting portions) of the base part 7.

After installing the cartridges (optical functional objects 5) in the base part 7, the positions of the third collimators are adjusted where appropriate. Alternatively, the positions of the first and second optical fiber collimators 2 and 3 may also be aligned. For aligning the positions of the third collimators, the alignment mechanisms are used. As a result of aligning the positions of the collimators, the optical coupling between the first and second optical fiber collimators 2 and 3 and the optical devices 4 can be optimized. For example, when an optical amplification fiber is used as one of the optical devices 4, optical amplification can be achieved within the module. When such a fiber-based optical device is used, the existence of the third collimators allows effective optical coupling with the first and second optical fiber collimators 2 and 3.

INDUSTRIAL APPLICABILITY

The present invention can be used in the technical field of optical communication equipment.

REFERENCE SIGNS LIST 2 first optical fiber collimator
3 second optical fiber collimator
4 optical device
5 optical functional object
7 base part
10 cartridge type optical functional module
13 third collimator
17 first alignment mechanism

The invention claimed is:

1. A cartridge-type optical functional module, comprising:
first and second optical fiber collimators opposed to each other;
an optical functional object including at least one optical device having an optical function placed therein and positioned to allow optical coupling between the first and second optical fiber collimators; and
a base part that fixes the first and second optical fiber collimators and in which the optical functional object is detachably placed,
wherein the optical device is an optical fiber-based module or a waveguide-based module, and
the optical functional object includes:
a third collimator; and
a first alignment mechanism to align a position of the third collimator in the optical functional object.

2. The cartridge-type optical functional module according to claim 1,
wherein the first alignment mechanism is a mechanism to align vertical and horizontal positions of the third collimator.

3. The cartridge-type optical functional module according to claim 1,
wherein the optical device is an optical fiber amplifier.

4. The cartridge-type optical functional module according to claim 1,
wherein the optical device is an optical delay circuit.

* * * * *